J. H. UPTON.
AUTOMOBILE HORN.
APPLICATION FILED MAR. 23, 1914.
1,116,174.
Patented Nov. 3, 1914.
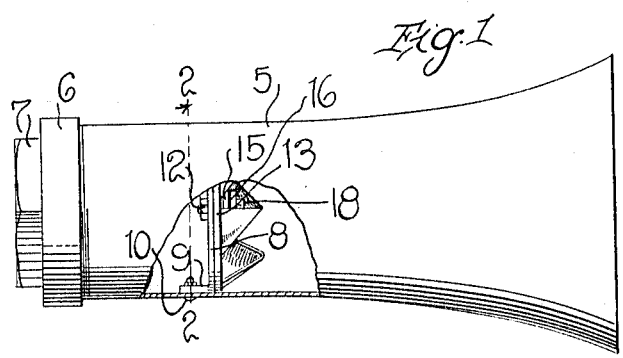
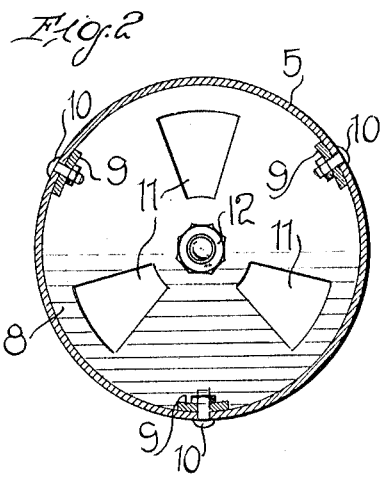
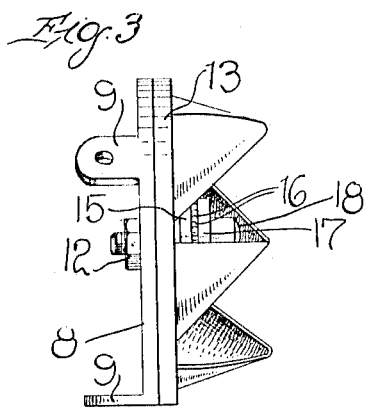
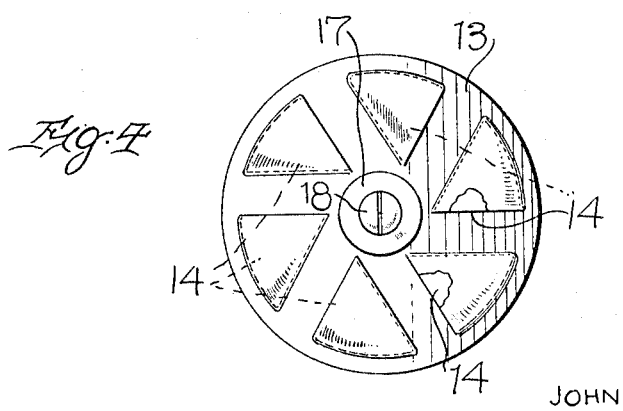
Inventor
JOHN H. UPTON

UNITED STATES PATENT OFFICE.

JOHN HENRY UPTON, OF DUNSMUIR, CALIFORNIA.

AUTOMOBILE-HORN.

1,116,174.  Specification of Letters Patent.  Patented Nov. 3, 1914.

Application filed March 23, 1914.  Serial No. 826,723.

*To all whom it may concern:*

Be it known that I, JOHN HENRY UPTON, citizen of the United States, residing at Dunsmuir, in the county of Siskiyou and State of California, have invented certain new and useful Improvements in Automobile-Horns, of which the following is a specification, reference being had to the accompanying drawings.

This invention relates to an improved automobile siren or horn and has for its primary object to provide a simple and efficient device of this character which is designed for connection with the exhaust of the engine, whereby the exhaust may be utilized for the operation of the device and cause the latter to emit a warning blast of sound.

More specifically stated, my invention has for a very important object to provide a device of the above character embodying a tubular body member having a disk secured therein said disk being provided with a plurality of openings, and a rotatable member mounted upon one face of said disk and provided with means whereby, in the passage of the exhaust through the openings in said disk, said member is rotated, whereby the same coöperates with the openings in the disk to produce the warning sound.

The invention has for a further object to provide a siren or horn for motor vehicles, which is very simple in its construction, durable and reliable in practical use and may be easily and quickly applied to the exhaust of the engine or removed therefrom.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of an automobile siren, the body thereof being partly broken away; Fig. 2 is a section taken on the line 2—2 of Fig. 1; Fig. 3 is an enlarged detail elevation of the sound producing elements; Fig. 4 is a face view of the rotatable disk.

Referring in detail to the drawing, 5 designates the horn body which is of tubular construction and preferably flared at one end. The opposite end of this horn is provided with exterior screw threads to receive an interiorly threaded flange 6 upon the coupling member 7. This member is also provided with interior threads upon its body portion for engagement with the exteriorly threaded end of an exhaust pipe, (not shown).

Within the tubular body 5 of the horn, a metal disk 8 is arranged, said disk being provided upon its edge with laterally projecting ears or lugs 9 adapted to be securely fastened to the wall of the horn 5 by means of bolts or rivets 10. This disk is provided with a plurality of tapering openings 11, said openings gradually increasing in width from the central portion to the outer edge of the disk. This disk is further provided with a central circular opening to receive a bolt 12.

Upon the bolt 12, the rotatable disk 13 is engaged. This disk is also provided with a plurality of substantially triangular shaped openings 14, and preferably twice as many of these openings are provided as the number of openings 11 in the disk 8. This latter disk 13 is also formed with a central opening for the accommodation of the bolt 12 and a cylindrical boss 15 surrounds said opening. This boss is provided in its end face with an annular race way to receive a series of bearing balls 16. The end of the bolt 12 is provided with a collar 17 opposed to the boss 15 and also provided with a race way to receive said bearing balls. The other end of the bolt 12 is threaded to receive the nut 18 whereby said bolt is held in position and the rotary disk 13 retained in proper relation to the stationary disk 8.

It will be noted from reference to Fig. 4 that one of the edges of each of the openings 14 extends tangentially from the periphery of the boss 15. This edge of the opening as well as the outer curved edge which extends in concentric relation to the periphery of the disk is provided with a laterally extending flange or plate 19. These flanges are integrally connected at the juncture of said edges of the opening.

In the use of my invention, the same is adapted to be connected to the exhaust pipe of a motor vehicle engine through the medium of the coupling member 7. In the discharge of the exhaust, the same is directed against the disk 8 and passes through the openings 11 thereof. This exhaust impinging against the curved outer plate or flange 19 on the disk 14 rotates said disk. It will be noted that these plates or flanges are of tapering triangular form whereby, as they pass the openings 11 in the disk 8, the passage of the exhaust through the gradually widening opening will result in a loud noise which will be practically continuous owing to the arrangement of the openings in the rotating disk 13.

It will be seen from this description that I have produced a very simple and effective device whereby the exhaust of the motor vehicle engine may be utilized for the purpose of producing a warning sound or noise and thereby operating to minimize the number of accidents occurring in the operation of such vehicles.

The several parts of my invention are of very simple form, and may be produced at small manufacturing cost.

It will be apparent that the device can be made in various sizes and the openings in the rotating and stationary disks may be of such size with relation to each other that either a prolonged practically continuous noise produced, or short intermittent blasts of noise, as may be preferred. It will therefore be obvious that in putting the invention into practical use, I do not desire to be restricted to the particular form and construction of the several elements employed but reserve the privilege of resorting to all legitimate modifications thereof as may be fairly embodied within the spirit and scope of the invention as claimed.

Having thus described the invention, what is claimed is:

A device of the character described comprising a tubular body and means for connecting the same at one end to the exhaust of an engine, a stationary disk secured within said body and having a plurality of radially disposed tapering openings therein, a second disk rotatably mounted upon one face of the stationary disk, said latter disk also being provided with a plurality of triangular shaped openings, the outer edges of which are disposed in concentric relation to the edge of the disk, and integrally connected triangular shaped blades projecting laterally from the outer edge and one of the other edges of each of said triangular openings, substantially as and for the purpose specified.

In testimony whereof I hereunto affix my signature in the presence of two witnesses.

JOHN HENRY UPTON.

Witnesses:
F. M. WALKER,
H. M. BURGESS.

Copies of this patent may be obtained for five cents each, by addressing the "Commissioner of Patents, Washington, D. C."